(12) United States Patent
Watanabe et al.

(10) Patent No.: US 7,093,619 B2
(45) Date of Patent: Aug. 22, 2006

(54) VACUUM-INSULATED PIPE

(75) Inventors: Michihiko Watanabe, Osaka (JP); Yoshihisa Takahashi, Tokyo (JP); Kimiyoshi Matsuo, Tokyo (JP); Shoichi Honjo, Tokyo (JP); Tomoo Mimura, Tokyo (JP); Terumitsu Aiba, Tokyo (JP)

(73) Assignees: Sumitomo Electric Industries, Ltd., Osaka (JP); The Tokyo Electric Power Company Incorporated, Tokyo (JP)

( * ) Notice: Subject to any disclaimer, the term of this patent is extended or adjusted under 35 U.S.C. 154(b) by 0 days.

(21) Appl. No.: 10/496,796

(22) PCT Filed: Mar. 24, 2003

(86) PCT No.: PCT/JP03/03547

§ 371 (c)(1),
(2), (4) Date: Jun. 7, 2004

(87) PCT Pub. No.: WO03/081120

PCT Pub. Date: Oct. 2, 2003

(65) Prior Publication Data

US 2005/0011574 A1    Jan. 20, 2005

(30) Foreign Application Priority Data

Mar. 25, 2002    (JP)    ............................. 2002-083080

(51) Int. Cl.
*F16L 59/06* (2006.01)
(52) U.S. Cl. ..................... 138/114; 138/149; 138/148; 285/47

(58) Field of Classification Search ................ 138/114, 138/148, 149, 108; 285/47, 123.1; 62/50.7
See application file for complete search history.

(56) References Cited

U.S. PATENT DOCUMENTS 1,989,999 A * 2/1935 Niederle ...................... 126/639
3,146,005 A * 8/1964 Peyton ......................... 285/47

(Continued)

FOREIGN PATENT DOCUMENTS

DE    3142702 A1 *    5/1983

(Continued)

*Primary Examiner*—Patrick Brinson
(74) *Attorney, Agent, or Firm*—Foley & Lardner LLP

(57) ABSTRACT

To provide a thermal insulation piping with no radially projecting part from a periphery thereof, so as to facilitate insertion of the thermal insulation piping into a pipeline or equivalent. In a thermal insulation tube 10 having a vacuum layer between an inner tube 11 and an outer tube 12, an evacuation port 30 for vacuum evacuation is oriented parallel with a longitudinal direction of the thermal insulation piping at an end of the thermal insulation tube 10. This construction can produce the thermal insulation tube 10 with no radially projecting part from a periphery thereof, thus providing improved workability when the thermal insulation piping is contained in the pipeline or equivalent. Further, a flexible pipe(s) 40 is/are preferably connected to the evacuation port(s) 30. This can allow increased positional tolerances in the connection of the evacuation port(s) to a vacuum evacuation device.

1 Claim, 3 Drawing Sheets

U.S. PATENT DOCUMENTS

| | | | | |
|---|---|---|---|---|
| 3,765,705 | A | * | 10/1973 | Tantam .................. 285/47 |
| 3,988,029 | A | * | 10/1976 | Gibson ................... 285/47 |
| 4,183,351 | A | * | 1/1980 | Hinotani et al. ........ 126/652 |
| 4,515,397 | A | * | 5/1985 | Nowobilski et al. ...... 285/47 |
| 4,667,390 | A | * | 5/1987 | Acharya et al. ........ 29/455.1 |
| 5,996,643 | A | * | 12/1999 | Stonitsch ............... 138/143 |
| 6,094,922 | A | | 8/2000 | Ziegler ............... 138/114 X |
| 6,216,745 | B1 | * | 4/2001 | Augustynowicz et al. .. 138/149 |
| 6,883,549 | B1 | * | 4/2005 | Schippl ................. 138/114 |

FOREIGN PATENT DOCUMENTS

| | | |
|---|---|---|
| GB | 1 001 528 A | 8/1965 |
| JP | 62-114292 | 7/1987 |
| JP | 11-044389 | 2/1999 |
| JP | 2000-081192 A | 3/2000 |

* cited by examiner

VACUUM-INSULATED PIPE

TECHNICAL FIELD

The present invention relates to a thermal insulation piping having a double tube structure. More particularly, the present invention relates to a thermal insulation piping that provides no projecting part around an outside thereof to facilitate insertion of the thermal insulation piping in a pipeline.

BACKGROUND ART

A thermal insulation pipe, such as a water-supply pipe, is generally known from the technology disclosed by Japanese Patent Laid-open (Unexamined) Publication No. 2000-81192. This has the construction wherein a vacuum layer is formed in an interspace of a double tube 60 comprising an inner tube 61 and an outer tube 62, as shown in FIG. 2. The space between the inner and outer tubes is provided with a hollow fiber membrane unit 70 and minute hollow glass beads 80. The hollow fiber membrane unit 70 suppresses collision of gas molecules in that space. The minute hollow glass beads 80 provide increase of heat transfer distance. The combination of the hollow fiber membrane unit 70 and the minute hollow glass beads 80 provides enhanced thermal insulation effects. The interspace is provided, at an end thereof, with a sealing portion 85 formed by casting epoxy resin or equivalent. This thermal insulation tube including the vacuum layer must be provided with an evacuation port 90 to be connected with a vacuum evacuation device, for evacuation of the thermal insulation pipe. In general, the evacuation port 90 is oriented orthogonal to the thermal insulation pipe and is projected radially therefrom.

However, when the evacuation port is oriented orthogonal to the thermal insulation pipe, a maximum width D2 of the thermal insulation pipe at the evacuation port becomes larger than a maximum outer diameter D1 of the thermal insulation pipe (D2>D1). As a result of this, when the thermal insulation pipe is set, for example, in a pipeline or a narrow space, the evacuation port itself becomes an obstacle as a projecting part and thus imposes restrictions on the space where the thermal insulation pipe may be set in.

Further, when this thermal insulation pipe is set in, the projecting evacuation port, or a tip portion of the evacuation port to be connected with the vacuum evacuation device, in particular, is vulnerable to damage. Due to this, when the thermal insulation pipe having the projecting evacuation port is inserted in a pipeline or equivalent, some protection must be given to the evacuation port.

It is a principal object of the invention to provide a thermal insulation piping that provides no projecting part around an outside thereof to facilitate insertion of the thermal insulation piping in a pipeline.

DISCLOSURE OF INVENTION

The present invention provides a thermal insulation piping having a vacuum layer between an inner tube and an outer tube, wherein an evacuation port used for vacuum evacuation is oriented parallel with a longitudinal direction of the thermal insulation piping at an end thereof.

By orienting the evacuation port parallel with the longitudinal direction of the thermal insulation piping, no radial projection from the periphery of the thermal insulation piping is provided. This allows smooth insertion of the thermal insulation piping into a pipeline or equivalent. In addition, in comparison with the conventional thermal insulation piping that needs some protection for such a radially projecting evacuation port at the set-in work, the thermal insulation piping of the present invention can eliminate the need to give some protection to the evacuation port. This can facilitate the set-in work of the thermal insulation piping.

It is preferable that the thermal insulation piping includes a plurality of evacuation ports. The provision of the plurality of evacuation ports can provide reduced evacuation resistance to provide more effective evacuation.

It is preferable that a flexible pipe(s) is/are connected to the evacuation port(s). The connection of the flexible pipe(s) to the evacuation port(s) can facilitate the connection of the evacuation port(s) to a vacuum evacuation device in correspondence with the location of the vacuum evacuation device.

The inner and outer tubes of the thermal insulation piping are preferably in the form of a corrugated tube in terms of the flexion. When the corrugated tube is used for the inner and outer tubes, it is preferable that a straight double tube is interposed between an end of the evacuation port(s) and an end of the thermal insulation piping, and the straight inner tube of the double tube is connected to the corrugated inner tube in accordance with a minimum diameter of the corrugated inner tube, while also the straight outer tube is connected to the corrugated outer tube in accordance with a maximum diameter of the corrugated outer tube. This construction can provide an increased distance between the straight outer tube and the straight inner tube and thus an increased diameter of the evacuation port, and as such can allow effective evacuation. It should be noted that the phrase "the straight inner tube is connected to the corrugated inner tube in accordance with a minimum diameter of the corrugated inner tube" is intended to mean that the straight inner tube having an outer diameter equal to or smaller than the minimum diameter of the corrugated inner tube is connected to the corrugated inner tube. Also, the phrase "the straight outer tube is connected to the corrugated outer tube in accordance with a maximum diameter of the corrugated outer tube" is intended to mean that the straight outer tube having an inner diameter equal to or larger than the maximum diameter of the corrugated outer tube is connected to the corrugated outer tube.

BEST MODE FOR CARRYING OUT THE INVENTION

In the following, an embodiment of the present invention will be described.

Figure 1:
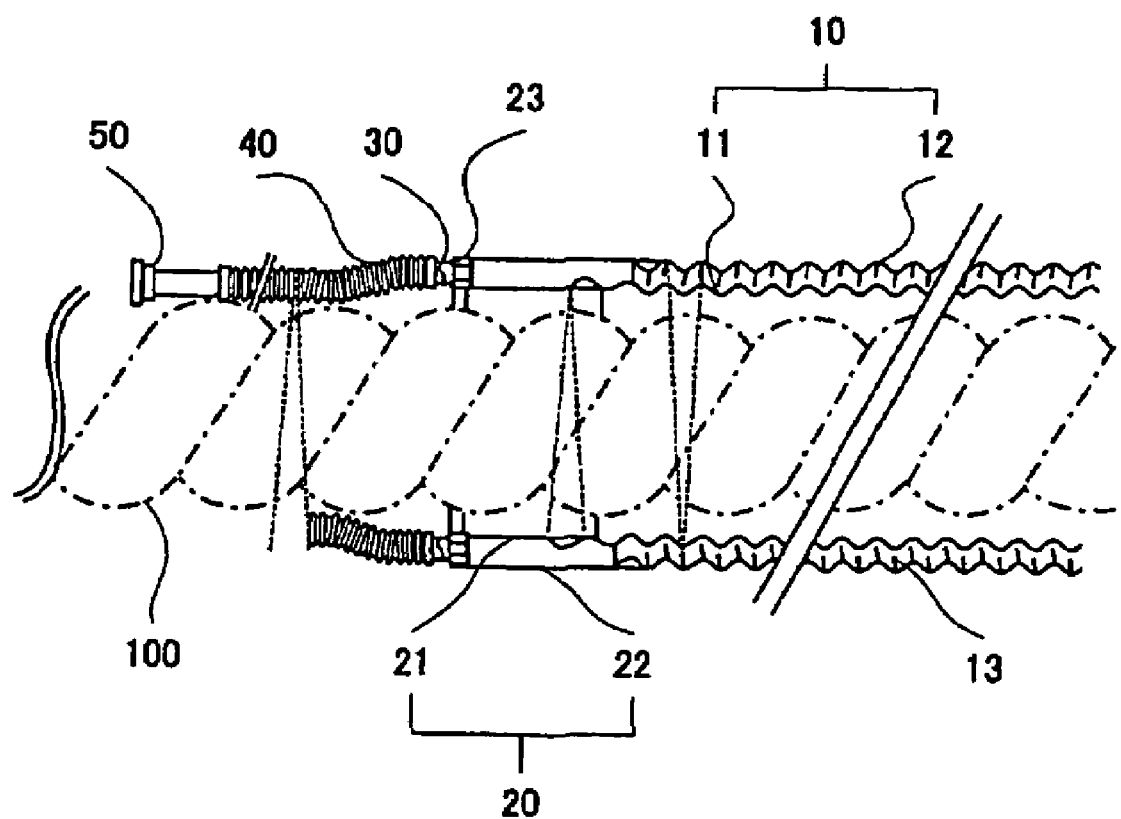
FIG. 1 is a vertical section of a thermal insulation piping of the present invention.
Figure 2:
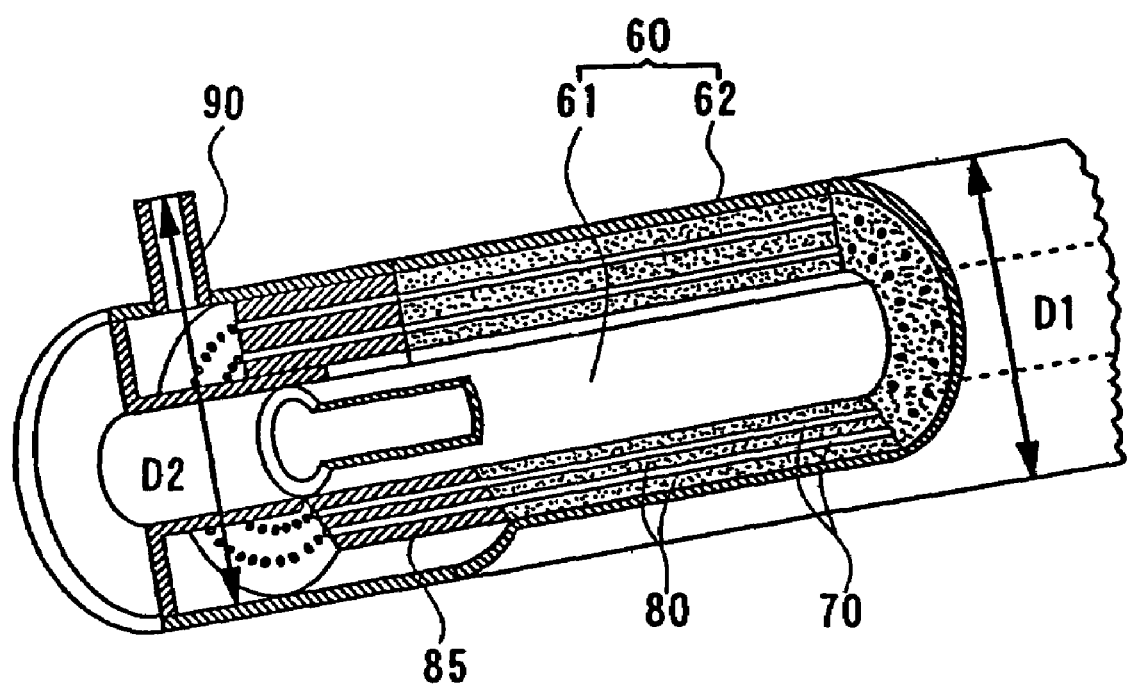
FIG. 2 is a partly cutout perspective view of a conventional thermal insulation piping.

FIG. 1 is a partial vertical section of a thermal insulation piping of the present invention. It is to be noted here that the thermal insulation piping used for a superconducting cable is illustrated as an example of the present invention.

The thermal insulation piping of the present invention has the construction wherein a thermal insulation tube 10 comprising an inner tube 11 and an outer tube 12 and having a vacuum layer therebetween is connected to a straight double tube 20 at an end thereof, and evacuation ports 30 are formed in an end face of the double tube 20. Further, the evacuation ports 30 are connected to flexible pipes 40.

The inner tube 11 and the outer tube 12 are preferably in the form of a corrugated tube formed of aluminum alloy or equivalent. The so-called "super-insulation" which is in the form of a laminated layer 13 comprising polypropylene mesh and aluminum foil is provided between the inner and outer tubes 11, 12. The space between the inner and outer tubes 11, 12 is evacuated and is held with vacuum.

A straight inner tube 21 is connected to an end of the corrugated inner tube 11, and a straight outer tube 22 is connected to the corrugated outer tube 12. In the illustrated embodiment, the corrugated inner tube 11 at an end portion of the thermal insulation tube 10 is elongated more than the corrugated outer tube 12 at the end portion of the thermal insulation tube 10. The straight inner tube 21 connected to the corrugated inner tube 11 has an outer diameter equal to or smaller than a minimum diameter of the corrugated inner tube 11. The straight outer tube 22 connected to the corrugated outer tube 12 has an inner diameter equal to or larger than a maximum diameter of the corrugated outer tube 12. The provision of the straight inner and outer tubes 21, 22 can provide an increased section area of the evacuation ports formed between the straight inner and outer tubes 21, 22. This can allow more effective evacuation.

The straight inner and outer tubes 21, 22 are sealed by a circular end plate 23 at ends thereof. The evacuation ports 30 are short tubes formed on the end plate 23. Since these evacuation ports 30 are oriented parallel with a longitudinal direction of the thermal insulation tube 10, the evacuation ports 30 do not project radially from the periphery of the thermal insulation tube, so that they do not become an obstacle when the thermal insulation tube 10 is inserted in the pipeline or equivalent. Also, a plurality of evacuation ports 30, when arranged circumferentially of the end plate 23, can provide reduced evacuation resistance to allow much more effective evacuation. The number of short tubes needed is determined in accordance with the required evacuation characteristics.

Further, the evacuation ports 30 are connected to flexible pipes. 40, respectively. The evacuation ports 30 must be connected with a vacuum evacuation device (not shown) to evacuate the space between the corrugated inner and outer tubes 11, 12 and hold that space with vacuum. The connection of the evacuation ports 30 with the vacuum evacuation device through the flexible pipes 40 can allow increased positional tolerances in the connection of the evacuation ports to the vacuum evacuation device, and as such can allow improvement in evacuation work.

The flexible pipes 40 are provided, at ends thereof, with sealing valves 50 for sealing off the space between the two corrugated tubes, respectively. The sealing valves 50 may be opened or closed arbitrarily so that the degree of vacuum can be controlled easily by the operation of the valves 50.

The thermal insulation piping thus constructed contains, for example, a superconducting cable core 100 having the construction mentioned below. The core 100 comprises a former, a superconducting layer, a dielectric layer and a shield layer, which are arranged in this order from the center. If necessary, a protection layer may additionally be formed around the outside of the shield layer. The former is basically a tubular construction through which a coolant, such as liquid nitrogen, flows. The superconducting layer comprises for example the superconductor of silver-sheathed wires twisted in several layers. The so-called high temperature superconducting material, such as a Bi-based high temperature superconducting material, is preferably used for the superconductor. The dielectric layer is preferably in the form of a kraft paper, or a laminate tape of polypropylene and kraft paper, wound onto the superconducting layer. Also, the shield layer preferably has the same construction as the superconducting layer. This core is contained in a thermal insulation piping shown in FIG. 1 in a single-core form or in a twisted multi-conductor form. The room formed between the thermal insulation tube and the core can also be used as a coolant flow channel.

In the thermal insulation piping thus constructed, the outer diameter of the straight double tube is made substantially equal to that of the flexible double tube. This allows smooth insertion of the thermal insulation piping into the pipeline or equivalent, without any hindrance.

Figure 3:
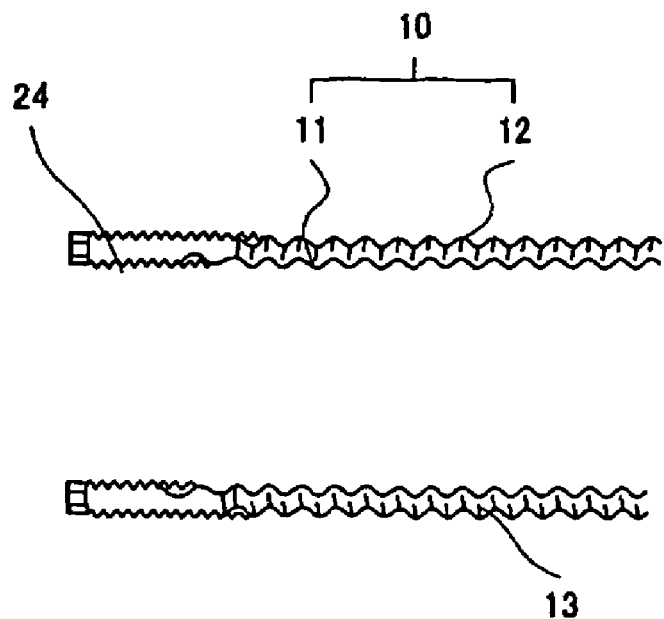
FIG. 3 is an illustration of the connection of a finely corrugated tube to a corrugated inner tube.
Figure 4:
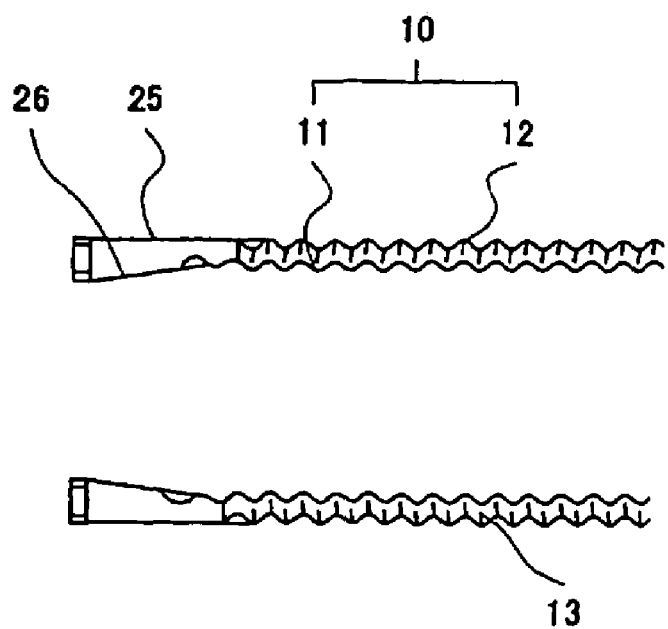
FIG. 4 is an illustration of the connection of a tapered tube to the corrugated inner tube.

In the example illustrated above, the straight double tube is connected to the corrugated double tube but, instead of the straight double tube, a finely corrugated tube 24 having finer corrugation than the corrugated inner tube 11 may be connected thereto (FIG. 3). The use of the finely corrugated tube 24 can provide increased flexibility, as compared with the straight double tube 20. Alternatively, a straight outer tube 25 may be connected to the corrugated outer tube 12, while on the other hand, a tapered tube 26 that becomes gradually smaller in inner diameter as it goes away from an end thereof is connected to the corrugated inner tube 11 (FIG. 4). The use of the tapered tube 26 can provide an increased distance between the end of the straight outer tube 25 and the end of the tapered tube 26 and thus can provide an increased section area of the evacuation port.

In the illustration above, the thermal insulation piping used for the superconducting cable is taken as an example. The thermal insulation piping of the present invention can be used for other pipes or lines requiring thermal insulation characteristics, such as a water supply line and a hot-water supply line.

INDUSTRIAL APPLICABILITY

As described above, according to the thermal insulation piping of the present invention, the evacuation ports for vacuum evacuation are arranged at an end of the thermal insulation tube and also oriented in parallel with the longitudinal direction of the thermal insulation piping. This can provide no radial projection from the periphery of the thermal insulation piping, and as such can allow smooth insertion of the thermal insulation piping into a pipeline or equivalent. Particularly when a number of evacuation ports thus oriented are arranged, more effective evacuation can be achieved.

In addition, the connection of the flexible pipes to the evacuation ports can allow increased positional tolerances in the connection of the evacuation ports to the vacuum evacuation device, and as such can allow improvement in evacuation work.

Further, the inner and outer tubes are in the form of a corrugated tube, and the straight double tube is interposed between the end of the evacuation port and the end of the thermal insulation tube. In addition to this, the straight inner tube of the double tube is connected to the corrugated inner tube in accordance with the minimum diameter of the corrugated inner tube, while also the straight outer tube is connected to the corrugated outer tube in accordance with the maximum diameter of the corrugated outer tube. This construction can provide an increased section area of the evacuation port.

Accordingly, an effective use of the thermal insulation piping of the present invention for a variety of pipes and equivalents, such as a superconducting cable, a cold-water pipe, a water-supply pipe, a LNG piping, a refrigerant pipe, a hot-water pipe, a hot-water supply line and a heat medium pipe, or for pipe joints, or for pipe equipment can be anticipated.

The invention claimed is:

1. A thermal insulation piping having a vacuum layer between an inner tube and an outer tube, wherein an evacuation port used for vacuum evacuation is oriented parallel with a longitudinal direction of the thermal insulation piping at an end thereof, and wherein the inner and outer tubes are in the form of a corrugated tube, and a straight double tube is interposed between an end of the evacuation port and an end of the thermal insulation piping, and wherein the straight inner tube of the double tube is connected to the corrugated inner tube in accordance with a minimum diameter of the corrugated inner tube, and the straight outer tube is connected to the corrugated outer tube in accordance with a maximum diameter of the corrugated outer tube.

* * * * *